Sept. 26, 1939.  W. J. COULTAS ET AL  2,174,307
PITMAN
Filed June 3, 1936
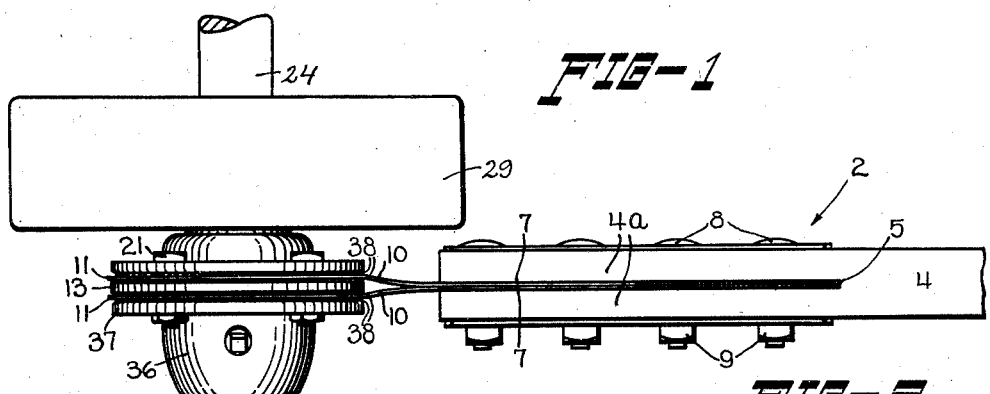
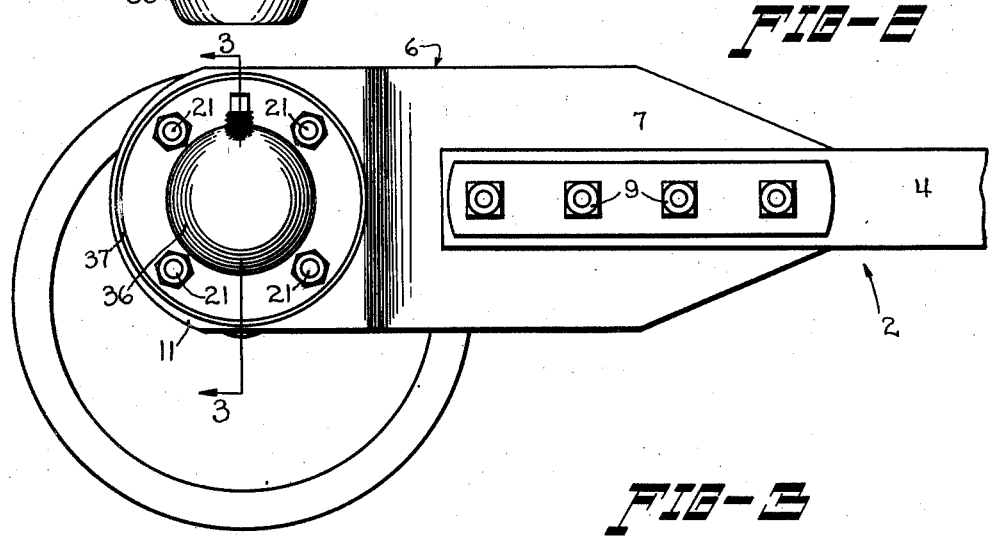
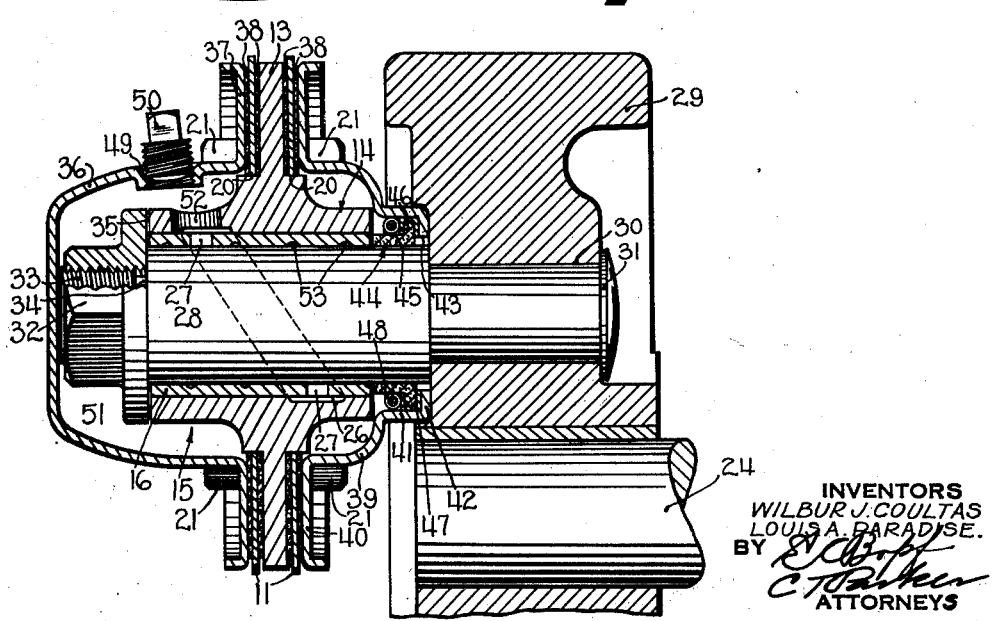
INVENTORS
WILBUR J. COULTAS
LOUIS A. PARADISE.
BY
ATTORNEYS Patented Sept. 26, 1939

2,174,307

UNITED STATES PATENT OFFICE 2,174,307

PITMAN

Wilbur J. Coultas and Louis A. Paradise, Moline, Ill., assignors to Deere & Company, Moline, Ill., a corporation of Illinois Application June 3, 1936, Serial No. 83,292

12 Claims. (Cl. 308—67)

The present invention relates generally to pitmans and pitman connections for agricultural implements such as mowers, harvesters and the like, and more particularly to an improved bearing construction therefor.

The type of service in which pitmans of this class are employed is particularly unfavorable to the open type bearing, because of the high speeds of operation and the dusty atmosphere in which they must operate, especially in the case of mowers in which the pitman is disposed close to the ground. Although the oil-lubricated sleeve-type bearing is generally the least expensive, as well as the most rugged bearing when properly lubricated, the conventional design of this class of bearing is unsatisfactory not only because it is difficult to prevent dust from getting in between the bearing surfaces, but also because the heat generated by the high speed of operation results in a high rate of oil evaporation, and consequently it is necessary to frequently oil that type of bearing.

Conventional oil reservoirs would not operate satisfactorily in connection with pitman bearings because of the fact that the bearing must travel at a high rate of speed in an orbital path, which would make it difficult to retain oil within the reservoir. The principal object of the present invention relates to the provision of an oil-lubricated bearing having an oil reservoir of an improved construction for effectively retaining oil therein, the bearing being totally enclosed as a protection against dust and dirt. United States Patent No. 2,082,258, granted June 1, 1937 to Louis A. Paradise, one of the joint inventors of the present invention, discloses an improved pitman comprising a rod connected to the bearing member by means of a pair of flexible plates, which are disposed within, in juxtaposition, a longitudinal slot in the end of the rod, the other end of the plates diverging to receive between them a flange which is attached to the bearing member. The bearing shown in the copending application is of the grease-lubricated open type bearing. It is a further object of the present invention to provide protective enclosures and an oil reservoir that can be simply and inexpensively provided for a pitman of the type disclosed therein.

Other objects will be made clear to those skilled in the art by consideration of the following description and explanation, reference being had to the drawing appended to this specification in which—

Figure 1 is a plan view showing a pitman bearing embodying the principles of the present invention, and showing the means for connecting it to the end of the pitman rod;

Figure 2 is a side elevation; and,

Figure 3 is a section through the bearing along the line 3—3 of Figure 2.

The pitman is indicated in its entirety by the reference numeral 2 and includes a pitman rod 4, which is usually, but not necessarily, made of wood. The rod is bifurcated at one end to provide a longitudinally extending slot 5 which is preferably centrally disposed on the longitudinal axis of the rod. A pair of connecting plates 6 include sections 7 which lie flatly together in juxtaposition within the slot 5. The end portions 4a of the pitman rod 4 and the plate portions 7 are provided with aligned apertures to receive bolts 8 secured by nuts 9 by which the plates are rigidly secured to the pitman bar 4.

As explained in the copending application, the apertures in the plates 6 can be made slightly larger than the bolts in order to compensate for misalignment of the bearing. The plates 6 extend beyond the end of the pitman bar 4 and diverge outwardly as at 10 and terminate in parallel laterally spaced or offset sections 11, that are disposed on opposite sides of a flange 13 formed integral with or carried by the hub 14 of the pitman bearing member, indicated in its entirety by the reference numeral 15, and includes a bushing or sleeve 16. As best shown in Figure 3, each of the laterally spaced sections 11 is provided with a large central opening 20 to receive the hub 14 of the bearing member 15.

Disposed within the bearing is a crank pin 28, which is rigidly secured within a crank or fly wheel 29 as by inserting the pin through an opening 30 in the fly wheel and upsetting the end 31 of the crank pin. The bearing member 15 is held on the crank pin 28 by means of a nut 32 which engages a threaded extension 33 on the crank pin. The nut 32 is screwed firmly against a shoulder 34 on the crank pin, but a small clearance, as at 35, is provided to permit relative rotation between the retaining nut 32 and the bearing member 15.

An outer cup-shaped enclosure 36 having a radially outwardly extending flange 37 embraces the outer end of the assembled bearing, the flange 37 coinciding and cooperating with the strap section 11 and the bearing flange 13 to provide a complete enclosure for the outer end of the bearing. Gaskets 38 are provided between the flange 13 and the strap section 11, and also between the strap section 11 and the enclosure flange 37 to effectively seal the joint to prevent oil leakage.

An inner cup-shaped enclosure 39 is disposed on the opposite side of the bearing flange 13 and has a radially outwardly extending flange 40 which coincides and cooperates with the strap section 11 and bearing flange 13 in the manner previously described. Gaskets 38 are provided to seal the joints.

A plurality of apertures are provided in the bearing flange 13, the strap sections 11, the enclosure flange 37, 40 and the gaskets 38, and respective apertures in the several members are disposed in alignment for receiving through bolts 21, which secure the strap members 11 and enclosure flanges 37, 40 to the bearing flange 13. Although four such bolts are indicated, any other suitable number can be used.

The inner enclosure 39 is provided with a short tubular portion 41 terminating in an end wall 42 in which is a centrally disposed opening 43 to receive the crank pin 28, clearance being provided for relative rotation between the crank pin 28 and the wall 42. The inside diameter of the tubular portion 41 is sufficiently larger than the crank pin 28 to provide space for an oil seal 44 which includes a cylindrical packing member 45, of leather or other suitable material. A radially extending lip 46 on the packing member 45 is held within a retaining ring 47 of U-shaped cross section, which fits snugly within the tubular portion 41 of the housing and against the end wall 42. A coil spring 48 encircles the packing member 45 to hold it in contact with the crank pin 28. Oil is supplied to the housing through a tapped opening 49 in the enclosure 36, which opening is stoppered by means of a threaded plug 50. The enclosures thus provide a reservoir 51 within which oil is retained.

Oil is supplied to the bearing surfaces through a hole 52 in the hub 14, in communication with a spiral groove 26 between the hub 14 and the sleeve 16. Openings 27 in the sleeve 16 communicate with this groove 26 through which oil flows to the crank pin 28. Suitable oil grooves 53 are provided on the inner surface of the sleeve 16 for distributing oil over the bearing in a manner which is well known.

During operation, the fly wheel 29 rotates with the main shaft 24, causing the crank pin 28 to revolve in an orbit about the shaft 24. The pitman has a reciprocating motion, the bearing member 15 moving in the orbit with the crank pin but, of course, without rotation with respect to the pitman rod. Hence the crank pin 28 rotates within the bearing member 15.

What we consider new and desire to protect by Letters Patent of the United States is set forth in the claims which follow.

We claim:

1. In a pitman, having a body portion, and a pair of strap members attached to one end thereof, a bearing member having a hub portion and a radially extending flange, the end portions of said strap members being spaced apart to receive said flange therebetween, each of said end portions having an opening to receive the hub portion of said bearing member, a pair of cup-shaped enclosures disposed one on each side of said flange and embracing said bearing member, each of said enclosures having radially extending flanges coinciding with said strap members, said strap members, said enclosure flanges, and the flange on said bearing member having aligned apertures, and bolt means extending through said aligned apertures for securing said bearing member and said enclosures to said strap members.

2. In a pitman comprising a bar having a longitudinally extending slot disposed in one end thereof, a pair of strap members having at one end juxtaposed sections fitting within said slot, and means for securing said strap members to said pitman bar, a bearing member having a hub portion and a radially outwardly extending flange, the end portions of said strap members opposite the juxtaposed sections thereof including offset sections spaced apart to receive said flange therebetween, each of said offset sections having a central opening to receive the hub of said bearing member, a pair of cup-shaped enclosures having radially outwardly extending flanges, one of said enclosures having a central opening to receive a shaft, and means for securing one of said strap members and one of said enclosure flanges on each side of said bearing flange, respectively.

3. In a pitman comprising a bar having a longitudinally extending slot disposed in one end thereof, a pair of strap members having at one end juxtaposed sections fitting within said slot, and means for securing said strap members to said pitman bar, a bearing member having a hub portion and a radially outwardly extending flange, the end portions of said strap members opposite the juxtaposed sections thereof including offset sections spaced apart to receive said flange therebetween, each of said offset sections having a central opening to receive the hub of said bearing member, and an oil retaining housing comprising a pair of cup-shaped enclosure members having outwardly extending flanges, one of said enclosure members having a central opening to receive a shaft, sealing means between said enclosure member and said shaft for retaining oil within said housing, and means for securing in oil-tight relation one of said strap members and one of said enclosure flanges on each side of said bearing flange, respectively.

4. In a pitman comprising a bar having a longitudinally extending slot disposed in one end thereof, a pair of sheet metal strap members appreciably wider than said bar and having at one end juxtaposed sections fitting within said slot, there being aligned apertures in said strap sections and the slotted end of said pitman bar, and means disposed within said aligned apertures connecting said strap member to said pitman bar, a bearing member having a hub portion and a radially outwardly extending flange provided with openings formed therein, the end portions of said strap members opposite the juxtaposed sections thereof including offset sections spaced apart to receive said flange therebetween, each of said offset sections having a central opening to receive the hub of said bearing member and a plurality of openings registering with the openings in said flange, a pair of cup-shaped enclosures having radially outwardly extending flanges provided with openings registering with said openings in said bearing flange and said strap members, one of said enclosures having a central opening to receive a shaft, and means disposed in said registering openings for securing said strap members and said enclosures to said bearing members.

5. In a pitman having connecting plates fixed to one end thereof, a bearing hub having a circumferentially extending flange, an oil retaining housing member having a circumferentially extending flange, said plates and said flanges being disposed in juxtaposition and having aligned opertures, and bolt means extending through said aligned apertures for securing said plates and said flanges tightly together.

6. In a pitman having connecting plates attached to one end thereof, a bearing hub, a pair of cup-shaped complementary housing members embracing said hub, said hub and said housing members having circumferentially extending radial flanges, said flanges and said plates being disposed in juxtaposed relation and having aligned apertures, and means extending through said aligned apertures for securing said plates and flanges together.

7. In a pitman having connecting plates attached to one end thereof, a bearing hub, a pair of cup-shaped complementary housing members embracing said hub, said hub and said housing members having circumferentially extending radial flanges, a plurality of annular gaskets, said flanges, said plates, and said gaskets being arranged in juxtaposition, one of said gaskets being contiguous to each of said plates and flanges, and means for clamping the juxtaposed parts together.

8. In combination, a bearing hub, a pair of cup-shaped complementary housing members embracing said hub, said hub and said housing members having circumferentially extending radial flanges, a supporting member, said flanges and said supporting member being disposed in juxtaposed relation and having aligned apertures, and means extending through said aligned apertures for securing said supporting member and flanges together.

9. In a bearing of the class described, a hub member comprising a cylindrical body portion having a radially extending flange, a supporting plate disposed adjacent to said flange and having an opening for receiving said cylindrical body portion, an oil retaining housing comprising a pair of enclosure members embracing said hub member and having radially extending flanges adapted to lie in juxtaposed relation to said hub flange and said plate, and means for securing said flanges and said plate together.

10. In a pitman connection, a hub member, a bearing within said member, a connecting plate adapted to be attached to a pitman rod, means for attaching said connecting plate to said hub member for transmitting power between said pitman rod and said bearing, and separate housing means enclosing said hub member providing a reservoir about said hub member for lubricating fluid, said housing means being supported on said hub member and fixed thereto by said means for attaching the connecting plate to the hub.

11. In combination with a pitman bearing comprising a hub member having bearing means adapted to be journaled on a crank and a radially outwardly extending flange having a thickness which is appreciably less than the axial length of said hub member, an enclosure member embracing said hub and having a radially outwardly extending flange adapted to cooperate with said hub flange, and bolt means extending through aligned apertures in said flanges for securing the latter together, said bolt means serving as the sole support of said enclosure member.

12. In combination with a pitman bearing comprising a hub member having bearing means adapted to be journaled on a crank and a radially outwardly extending flange disposed intermediate the ends of said member and having a thickness which is appreciably less than the axial length of said hub, and a pair of cupped enclosure members disposed on opposite sides, respectively, of said flange for enclosing said hub and bearing means and having radially outwardly turned flanges adapted to lie upon opposite sides, respectively, of said flange and to be secured thereto, said flange serving to entirely support said enclosure members.

WILBUR J. COULTAS.
LOUIS A. PARADISE.